UNITED STATES PATENT OFFICE.

WILLIAM R. D. HALL, OF NARBERTH, PENNSYLVANIA, ASSIGNOR TO S. FEATHER COMPANY, A CORPORATION OF DELAWARE.

SPINNING IMITATION-MOHAIR YARN.

1,303,302.     Specification of Letters Patent.     Patented May 13, 1919.

No Drawing.     Application filed June 26, 1918. Serial No. 242,112.

*To all whom it may concern:*

Be it known that I, WILLIAM R. D. HALL, a citizen of the United States, residing at Narberth, in the county of Montgomery and State of Pennsylvania, have invented new and useful Improvements in Spinning Imitation-Mohair Yarn, of which the following is a specification.

In the manufacture of an imitation mohair difficulty has always been present in producing a finished yarn which has the luster of real mohair, but which does not feel harsher or softer than the real material.

According to my improved method of making imitation mohair I have found that this defect can be remedied by using artificial silk waste which is especially treated in a manner hereinafter referred to, which silk waste is then mixed in a proportion later specified, with wool which may be either virgin or reclaimed wool.

However, in view of the fact that artificial silk waste is a vegetable fiber and wool is an animal fiber, I find it necessary to treat the artificial silk waste in a manner so that it may nearly have the feel of real wool as well as its moisture resisting properties.

It is a well known fact that artificial silk waste is very susceptible to moisture and atmospheric conditions and normally contains 11 per cent. moisture, and I take it in this condition and, by drying it in any approved manner, reduce the moisture content to a point below 5½ per cent.

It is then treated with a vegetable oil, such as olive oil until it has absorbed between 6½ and 7½ per cent. of its weight, so that the moisture contained in such silk waste shall not increase during the subsequent operation of spinning, above 5½ per cent.

My preference for vegetable oil is explained by reason of the fact that in the subsequent operation of spinning and particularly dyeing, the vegetable oil may be removed from the artificial silk waste more readily than animal or mineral oils could be.

The product obtained from the above described process is then thoroughly mixed or blended, by any of the methods well-known and in use by the wool and worsted spinners, with wool in the proportion of 41 per cent. artificial silk waste and 59 per cent. wool.

Having thus described my improved method, what I claim is:

1. That process which consists in the production of artificial mohair by blending artificial silk waste, the moisture content of which has been reduced to 5½ per cent., with wool.

2. That process which consists in the production of artificial mohair by blending artificial silk waste, the moisture content of which has been reduced to a practical working point, and subsequently treated with a substance preventing the absorption of additional moisture, with wool.

3. That process which consists in the production of artificial mohair by blending with wool, artificial silk waste, the moisture content of which has been reduced to a practical working point then treated with an oil to prevent the further absorption of moisture.

4. That process which consists in the production of artificial mohair by blending artificial silk waste, the moisture content of which has been reduced to a practical working point, and which artificial waste has then been treated with a vegetable oil to prevent the absorption of moisture, with wool.

5. That process which consists in the production of artificial mohair by blending artificial silk waste, the moisture content of which has been reduced to a practical working point, and which artificial waste has then been treated with a vegetable oil to the extent of 6½ to 7½ per cent. of its own weight to prevent the absorption of moisture, with wool.

6. That process which consists in the production of artificial mohair by blending artificial silk waste with wool in the proportion of 41 per cent. artificial silk waste to 59 per cent. wool.

7. That process which consists in the production of artificial mohair by blending artificial silk waste which has had its moisture content reduced to a point not exceeding $5\frac{1}{2}$ per cent, and has been subsequently treated with a vegetable oil of from $6\frac{1}{2}$ per cent. to $7\frac{1}{2}$ per cent. of its own weight, to prevent the addition of further moisture, with wool in the percentage of 41 per cent. artificial silk waste to 59 per cent. wool.

WILLIAM R. D. HALL.